F. C. BORTON.
FEED TROUGH.
APPLICATION FILED NOV. 28, 1919.

1,334,075.

Patented Mar. 16, 1920.

INVENTOR
Fred C. Borton
by
Owen, Owen & Crampton

UNITED STATES PATENT OFFICE.

FRED C. BORTON, OF FAYETTE, OHIO.

FEED-TROUGH.

1,334,075.  Specification of Letters Patent.  Patented Mar. 16, 1920.

Application filed November 28, 1919. Serial No. 341,252.

*To all whom it may concern:*

Be it known that I, FRED C. BORTON, a citizen of the United States, and a resident of Fayette, in the county of Fulton and State of Ohio, have invented a certain new and useful Feed-Trough; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a feed trough for stock, which may be cheaply made and yet one which will automatically supply the feed as it is consumed by the stock. By my invention I provide a knockdownable structure whereby it may be readily shipped or disassembled and reassembled in any desired locality. The collapsible character of the structure is particularly of advantage not only in shipping the structure but also in moving the structure particularly where a large trough is to be moved from place to place, or to be stored.

The invention may be contained in troughs of different forms and to be used for different kinds of stock. To illustrate a practical application of my invention I have selected a trough containing the invention which is particularly adapted for feeding pigs. The structure selected for purposes of illustration is illustrated in the accompanying drawings.

Figure 1:
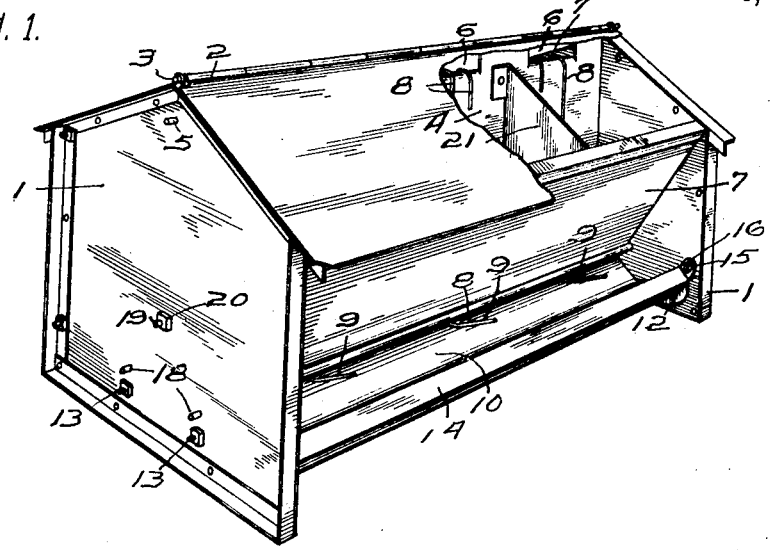
Figure 2:
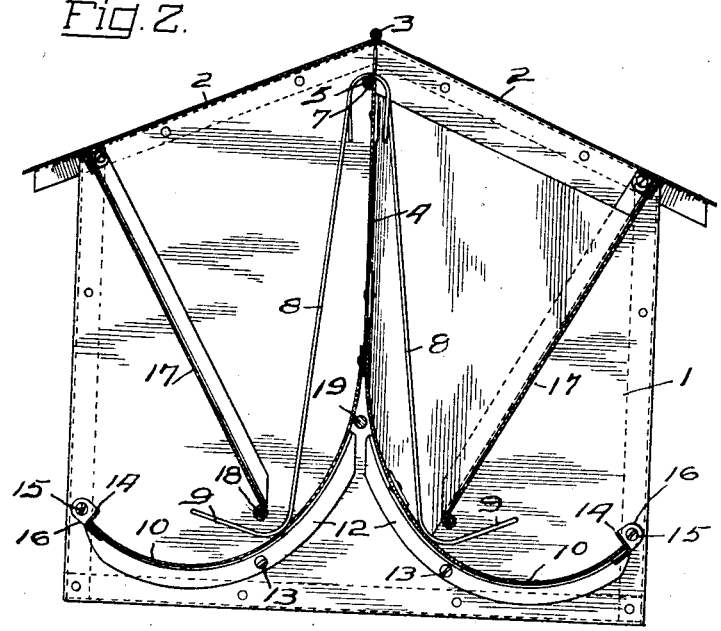

Figure 1 of the drawings illustrates a perspective view showing one or two of the compartments into which the trough may be divided. Fig. 2 illustrates a transverse sectional view of the trough.

In Fig. 1, 1 indicates the ends of the trough. 2 is the cover of the trough which is formed of two parts that are hinged together by means of the rod 3. It rests on the top corners of the ends 1 of the trough and the parts slope away from the center to shed water. The side edges of the parts extend well over the side edges of the ends of the trough to shelter the feed from the weather as much as possible. 4 is a partition extending between the ends 1 of the trough and having its upper edge secured in position by means of the rod 5 that extends through the ends of the trough. The upper edge of the trough has a plurality of vertical cuts and the spaces between the cuts are turned over to form lips that circle the rod 5. The lips when thus turned leave the spaces 6 along the upper edge of the partition 4. The lips 7 are disposed in spaced relation relative to each other. In the openings or spaces 6 are hung rods 8. Preferably a rod 8 is located on each side of the partition 4 and a pair of rods is hung over each lip 7. The rods 8 will thus be disposed in spaced relation along the partition 4.

The upper end of each rod is bent to form a U and in such a way that it loosely hangs on the lip 7 and the rod 5. The rods 8 extend to the bottom of the trough and their lower ends are bent outward and upward, as at 9. The lower edge of the partition 4 is connected to the two trough shaped parts 10 that flare and circle outward and upward. The ends of the circular trough shaped members 10 may be supported by the circular angle-irons 12 that may be screwed to the ends 1 of the trough by means of the screws 13. The side edges of the circular sheets 10 are protected and supported by means of the angle-irons 14 that are also secured to the ends by means of the screws 15 that pass through ears 16.

The trough is also provided with the hopper shaped walls 17 that extend from the upper side corners of the ends 1 to the circular sheet metal parts. The walls 17 are inclined inward toward the center of the trough and so as to leave a narrow space between the lower ends of the walls 17 and the sheet metal parts 10 to allow the feed that is inserted between the walls 17 and the partition 4 to pass down to the trough shaped sheet metal parts 10. The lower ends of the walls are secured in position by means of the rods 18 that extend through the ends 1. The lower edges of the walls 17 are bent around the rods 18 so as to permit the material to readily pass off from the walls 17 and enter the trough shaped parts 10. The lower ends of the rods 8 are so located that they pass beneath the lower edges of the walls 17 and extend substantially midway between the outside of the walls 17 and the trough shaped sheet metal parts 10. The rods 8 thus provide a means for disturbing the material if it gets stuck at the lower edges of the walls 17. The hogs seeking for their feed will run their noses along the lower edges of the walls 17 and push the rods 8 back and forth and thus the material is worked into the trough shaped parts 10.

The end walls and the parts are also tied together by means of the rod 19 which extends through the ends and is provided with a nut 20 that threads upon the end of the rod 19 which securely ties the parts together.

The spaces between the walls 17 and the central partition 4 may be subdivided as may be desired, such as by the cross-partition 21. This provides for different kinds of feed for the stock. By this arrangement proportioned amounts of different kinds of feed may be provided, as may be desired.

I claim:—

1. In a feed trough for stock, end walls, a central partition extending between the end walls, hopper walls extending from the upper and outer corners of the end walls inward toward the center of the trough, curved sheet metal trough shaped parts flaring from the lower edge of the central partition, rods having their upper ends hung on the central partition and extending below the hopper walls and outward and upward substantially midway between the hopper wall and the curved trough shaped parts.

2. In a trough, end walls, a central partition extending between the end walls, circular lips formed on the upper edge of the partition, a rod extending through the lips, curved trough shaped sheet metal parts connected to the lower edge of the partition and flaring outward from the partition, hopper walls extending from the upper and outer corners of the partition to near the curved sheet metal trough shaped parts, rods hung loosely on the lips and extending between the lower edge of the hopper walls and the curved trough shaped parts and outward substantially midway between the hopper walls and the curved sheet metal parts.

In testimony whereof I have hereunto signed my name to this specification.

FRED C. BORTON.